(12) United States Patent
Vicktorius et al.

(10) Patent No.: US 6,365,858 B1
(45) Date of Patent: Apr. 2, 2002

(54) DEVICE FOR SEPARATING METAL PARTS

(75) Inventors: Richard Vicktorius, Cologne; Volker Hain, Katzwinkel, both of (DE)

(73) Assignee: Pulsotronic Merten GmbH & Co. KG, Wiehl (DE)

( * ) Notice: Subject to any disclaimer, the term of this patent is extended or adjusted under 35 U.S.C. 154(b) by 0 days.

(21) Appl. No.: 09/588,173

(22) Filed: Jun. 7, 2000

(30) Foreign Application Priority Data

Jun. 16, 1999 (DE) .......................................... 199 27 368

(51) Int. Cl.[7] .............................................. B07C 5/344
(52) U.S. Cl. ...................................... 209/567; 406/182
(58) Field of Search .............................. 209/567, 655, 209/3, 28, 159, 168, 181, 182; 406/183

(56) References Cited

U.S. PATENT DOCUMENTS 5,269,638 A 12/1993 Sindermann et al.
5,377,847 A 1/1995 Kind

FOREIGN PATENT DOCUMENTS

DE 3931579 9/1990

*Primary Examiner*—Christopher P. Ellis
*Assistant Examiner*—Joe Dillon, Jr.
(74) *Attorney, Agent, or Firm*—Diller, Ramik & Wight

(57) ABSTRACT

The device for separating metal parts from a stream of material to be conveyed comprises a multiple-way junction (11) in the form of a rotary tubular multiple-way junction. The rotary tubular multiple-way junction contains a rotary element (36) configured as a stopcock having two inlet ducts (37,38) which can be selectively brought in congruence with an inlet opening (32), and an outlet duct (39). The outlet duct (39) normally leads to a material outlet (34) but is moved to the separation outlet (15) when the rotary element (36) is repositioned. A metal detector (28) responding to the presence of metal parts in the conveying duct (30) controls the rotary element (36) which is rotated by less than 90°0 for the purpose of separating the metal part.

5 Claims, 3 Drawing Sheets

DEVICE FOR SEPARATING METAL PARTS

BACKGROUND OF THE INVENTION

The invention relates to a device for separating metal parts from a stream of material to be conveyed, the device comprising a metal detector and a multiple-way junction controlled by the metal detector, the multiple-way junction comprising an inlet and two selectively controllable outlets.

In U.S. Pat. No. 5,377,847 a device for separating metal parts from a stream of material to be conveyed is described, where the multiple-way junction comprises a damper which can be swivelled about a transverse axis by a solenoid. In the end position the damper guides the stream of material to be conveyed to a first outlet opening which can be designated as material opening. In the opposite end position of the damper the stream of material to be conveyed is fed to a second outlet opening which can be designated as separation opening. The multiple-way junction is controlled as a function of the signals from a metal detector such that a stream of material to be conveyed, which does not contain any metal parts, is fed to the material opening while the damper is reversed when a metal part is detected. Thus the metal part and part of the stream of material to be conveyed are fed to the separation opening. When the conveying device is at a standstill or at a low velocity of the stream of material to be conveyed it may happen that the damper is blocked by the weight of the material to be conveyed. When the stream of material to be conveyed is moved with the aid of an air flow, problems with regard to tightness play an important role. It is difficult to ensure that the multiple-way junction remains tight in each damper position such that no air is taken in from outside and no compressed air leaves the conveying track. Solving this tightness problem requires high sealing efforts.

A device for separating metal parts described in DE 39 31 579 C1 comprises a multiple-way junction having a horizontally movable funnel-shaped slide which is open at its upper side. Here, sealing the conveying track beyond the multiple-way junction is not intended.

For tube conveyors multiple-way junctions are known which selectively feed the stream of material to be conveyed from an inlet to one of a plurality of outlets. Such a rotary tubular multiple-way junction according to U.S. Pat. No. 5,269,638 comprises a rotary element in a housing having an inlet opening and two outlet openings, the rotary element being of single-duct or dual-duct configuration. In the case of a single-duct rotary element the duct is connected with either of the outlets when the rotary element is rotated while it is permanently connected with the single inlet. In the case of a dual-duct rotary element the two ducts are completely separated from each other so that can have only very small passage cross-sections. In any case, such a rotary tubular multiple-way junction would not be suitable for metal separators since a rotation of the rotary element by 180° is necessary. What is desired is a relatively small rotation which allows a short response time. In the case of a single-duct multiple-way junction a rotation of the rotary element by at least 90° is necessary and in the case of a dual-duct multiple-way junction a detected metal part may not enter the duct for the metal-free stream of material since otherwise separation is not possible.

It is an object of the present invention to provide a device for separating metal parts, which can be configured with small dimensions and has a short change-over time.

SUMMARY OF THE INVENTION

The device according to the invention is configured as rotary tubular multiple-way junction having a tubular housing. An inlet opening and two outlet openings are arranged on the circumference of the housing. The housing contains a rotary element which selectively connects the inlet opening with either of the outlet openings. The rotary element comprises two adjacent inlet ducts extending at an acute angle to each other, and an outlet duct connected with both inlet ducts. By rotating the rotary element by less than 90° it is possible to change over between passage and separation. The change-over angle is preferably smaller than 90° and amounts to 30° to 60°. Thus the rotary element is allowed to have a relatively small diameter and relatively wide ducts. The duct volume of the rotary element is small so that, apart form the metal parts to be separated, only a small amount of material is separated. Further, short response times are realized.

The device is adapted to be directly mounted to the supply opening of a processing machine since it has smaller dimensions and a short response time. The device needs only little space and has an extremely small mounting length.

According to a preferred embodiment of the present invention the inlet ducts join each other without a partition being provided. This means that the inlet ducts are permanently congruent with the inlet opening of the housing so that the inlet opening is never closed or reduced in size during operation of the device. Of course, it is possible to set the rotary element in such a position that the inlet opening is closed, e.g. when the conveying device comes to a standstill.

The inlet opening and one outlet opening are preferably arranged diametrally opposite each other and the second outlet opening is offset relative to the first one by less than 60°. In this case, under normal conditions the stream of material to be conveyed moves diametrally along the rotary element without being diverted. When the metal detector responds, the rotary element is rotated by less than 60° so that the stream of material to be conveyed is diverted at an acute angle which is even smaller than 60°.

The width of the inlet ducts and the outlet duct preferably amounts to 0.4-times the diameter of the rotary element. Thus the volume of the rotary element is utilized to a large extent for material conveyance purposes.

BRIEF DESCRIPTION OF THE DRAWINGS

Hereunder an embodiment of the present invention is explained in detail with reference to the drawings in which.

DESCRIPTION OF THE PREFERRED EMBODIMENT

Figure 1:
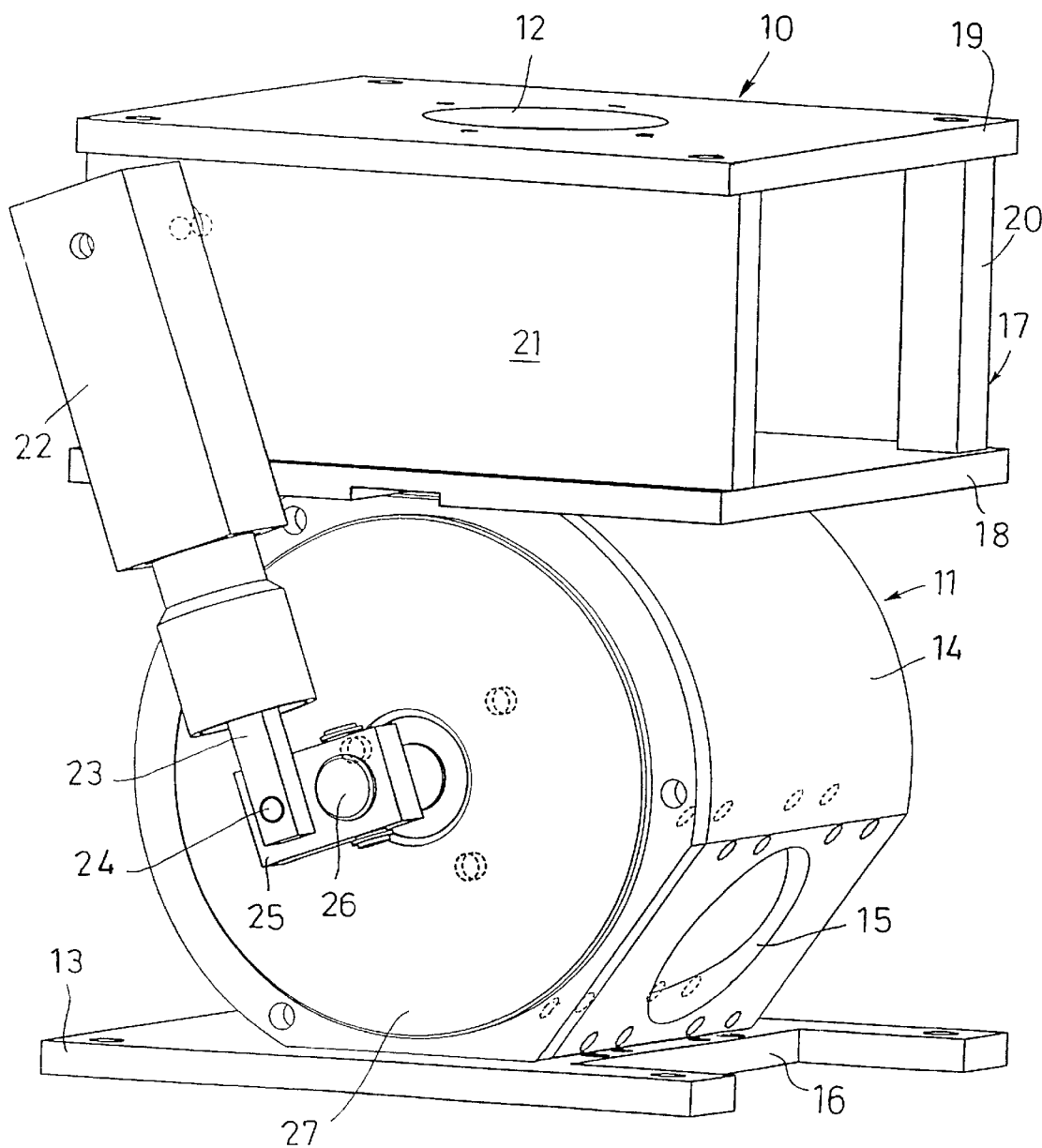
FIG. 1 shows a perspective side view of the device for separating metal parts.

The device comprises a detector portion 10 and a multiple-way junction 11. The conveying duct 12 extends through the detector portion 10 and the multiple-way junction 11 and vertically from top to bottom through the device. At the lower end of the multiple-way junction 11 a flange 13 is arranged which is adapted to be mounted on a processing machine to which the stream of material is fed.

The multiple-way junction 11 comprises a tubular housing 14 arranged with horizontal axis, whose inlet is located below the detector portion 10 on the upper side and whose outlet is located at the flange 13 on the lower side. A separation outlet 15 is provided in the lower half of the housing circumference. To allow a pipe (not shown) to be attached to the separation outlet 15, the flange 13 is provided with a recess below the separation outlet 15.

The detector portion 10 comprises a frame 17 having a lower plate 18 and an upper plate 19. Said plates 18,19 are kept at a distance to each other by a spacer 20. On one side of the frame the plates 18,19 are connected via a side wall 21. To the side wall 21 an actuator 22 is fastened which comprises a solenoid (not shown) or a pneumatic or hydraulic cylinder. The actuator 22 has an extensible push rod 23 which is connected via a hinge 24 with a stud 25. The stud 25 extends from a shaft 26 which axially protrudes from a front wall 27 of the tubular housing 14.

Figure 2:
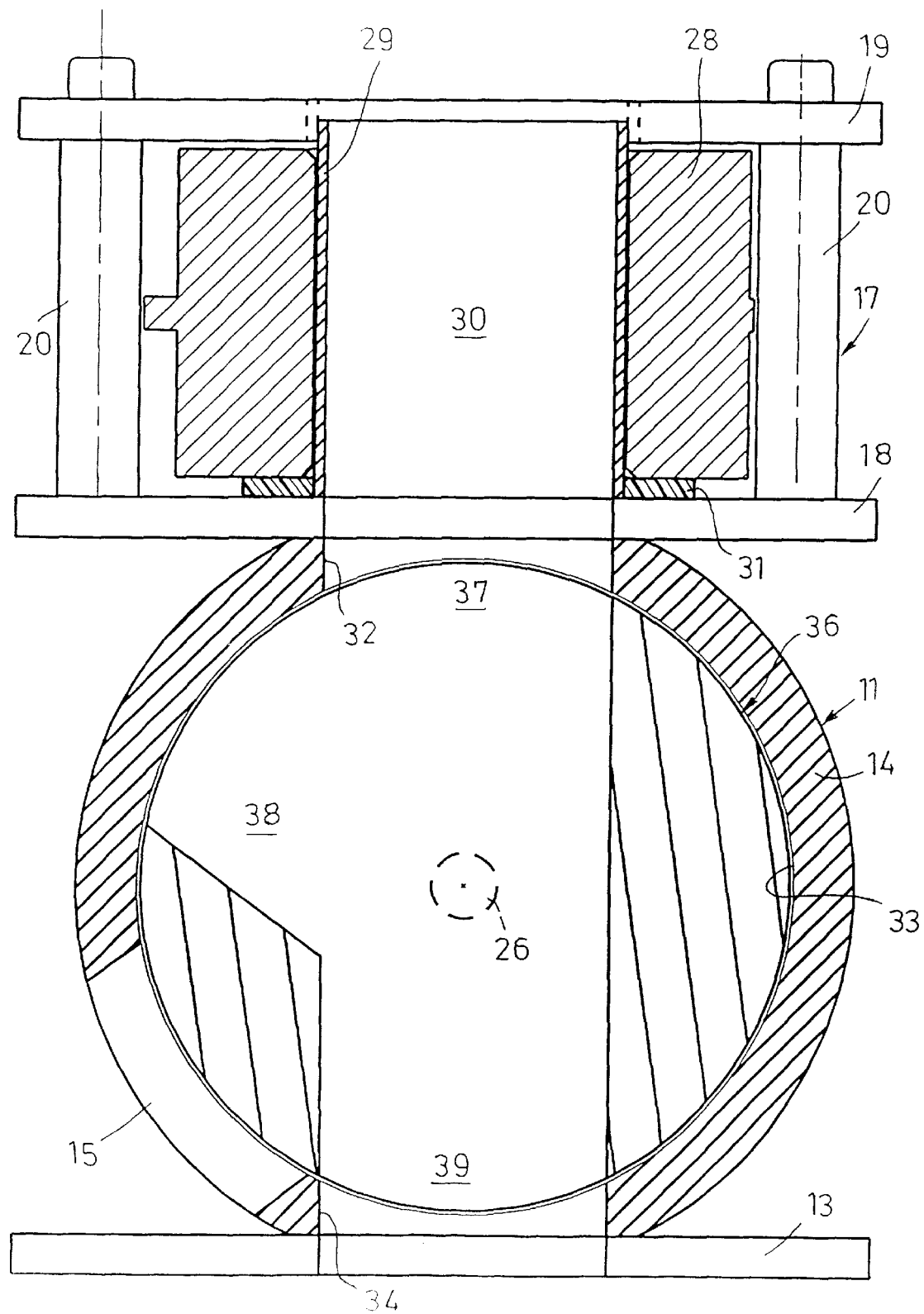
FIG. 2 shows a cross-section of the device with the rotary element in the passage position.

Within the frame 17 the metal detector 28 is fastened (FIG. 2). The metal detector 28 is of annular configuration and surrounds a plastic tube 29 forming the supply duct 30. The metal detector 28 is supported via a rubber ring 31 on the plate 18. The plate 18 is directly seated on the housing 14 so that the supply duct 30 is arranged flush with the inlet opening 32 of the housing 14. As shown in FIG. 2 the housing 14 has a cylindrical interior space 33 at which a first outlet opening 34 is provided diametrically opposite the inlet opening 32, which outlet opening 34 also extends through the flange 13. On the same cross-sectional plane a second outlet opening 15 is provided which is offset by an acute angle of approximately 40° to the first outlet opening 34.

In the housing 14 the rotary element 36 is arranged which is connected with the shaft 26. The rotary element is a substantially cylindrical stop-cock filling the interior space 33 wherein seals (not shown) may be provided around the inlet opening 32 and the outlet openings 34,15 to prevent air from escaping. The housing 14 is sealed towards the outside so that the interior space is connected only with the conveying pipe.

The rotary element 36 contains a radial first inlet duct 37 and a radial second inlet duct 38. The axes of the inlet ducts 37,38 are directed towards the axis of the shaft 26. Further, an outlet duct 39 is provided as a straight extension of the first inlet duct 37 with the second inlet duct 38 laterally joining the outlet duct 39. The axes of the inlet ducts 37,38 form an angle which is preferably smaller than 60°.

In the present embodiment the inlet ducts 37,38 are join each other without any web or partition being provided between said ducts. Consequently, the common opening of the inlet ducts 37,38 is always connected all-over with the inlet 32.

Figure 3:
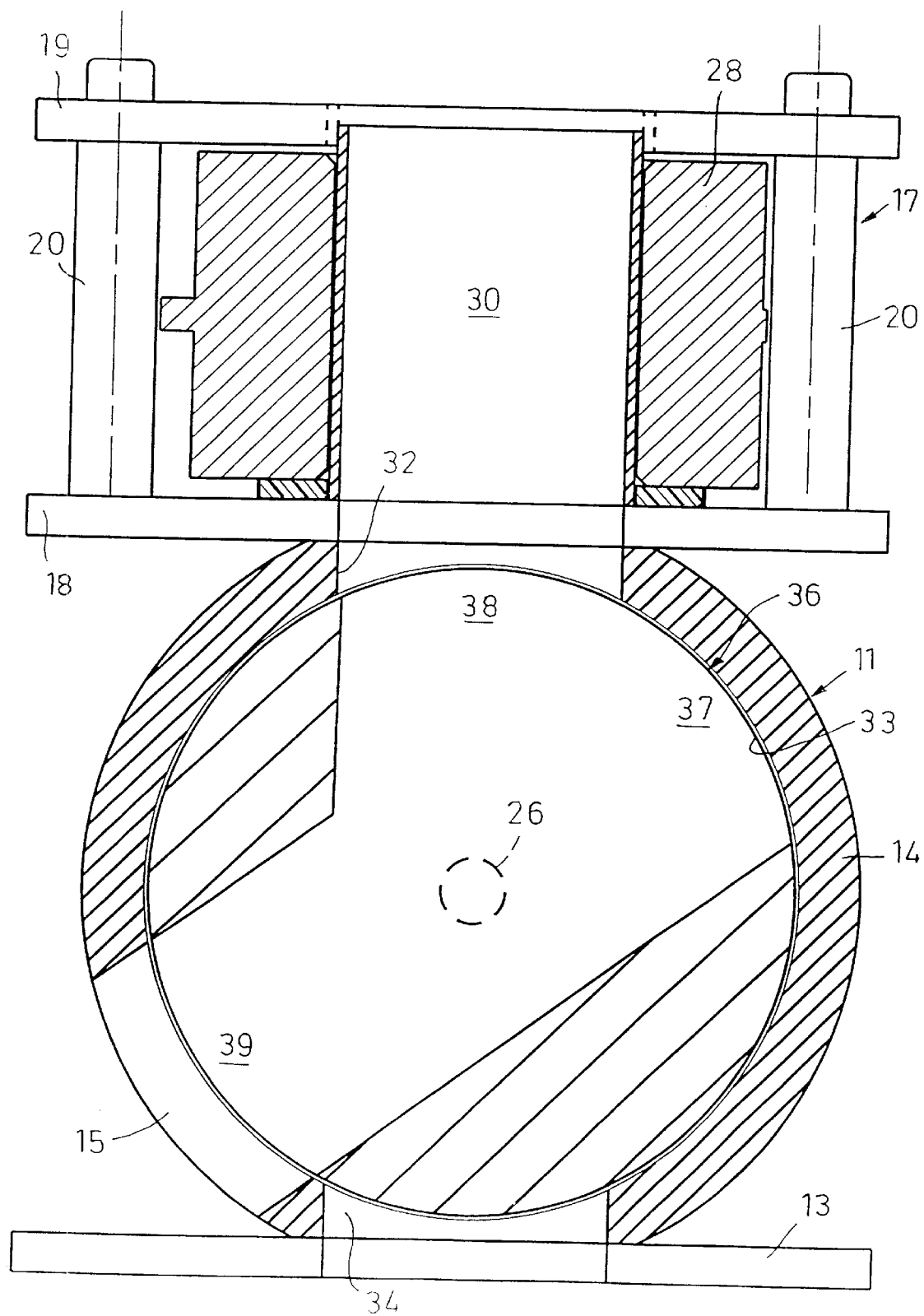
FIG. 3 shows a cross-section of the device with the rotary element in the separation position.

The rotary element 36 is rotated by the shaft 26 being rotated by the actuator 22. Thus a rotation by an angle of less than 90° is effected from the passage position shown in FIG. 2 to the separation position shown in FIG. 3.

The metal detector 28 is of known configuration and is thus not described in detail. If a metal part in the stream of material passing through the supply duct 30 is detected in a contactless manner, the metal detector responds. Then the metal detector 28 actuates the actuator 22 which effects a repositioning of the rotary element 36. Thus the rotary element 36 is moved from the passage position shown in FIG. 2 into the separation position shown in FIG. 3. In the separation position the stream of material is fed to the second inlet duct 38 and diverted in the rotary element 36 by less than 90°.

One advantage offered by the device is that separation of metal parts takes place even at very low passage velocities and when the conveying device has come to a standstill. The device has extremely short response times and separates metal parts detected in the stream of material without a larger amount of material to be conveyed being separated. After separation of a metal part the rotary element 36 automatically returns into the passage position.

The device is suitable for all kinds of material, e.g. granulated or pulverized material, which can be conveyed through pipes with conveyance being effected in particular by compressed air or suction action. A preferred application is feeding granulated material to plastic-processing machines where the device can be directly placed onto the inlet of the processing machine.

Although a preferred embodiment of the invention has been specifically illustrated and described herein, it is to be understood that minor variations may be made in the device without departing from the spirit and scope of the invention, as defined in the appended claims.

What is claimed is:

1. Device for separating metal parts from a stream of material to be conveyed, the device comprising a metal detector (28) and a multiple-way junction (11) controlled by the metal detector, the multiple-way junction having an inlet and two selectively controllable outlets, wherein the multiple-way junction (11) is configured as a rotary tubular multiple-way junction having a housing (14) on whose circumference an inlet opening (32) and two outlet openings (34, 15) are arranged, and a rotary element (36) supported therein, and wherein the rotary element (36) comprises two adjacent inlet ducts (37,38) extending at an acute angle to each other, and an outlet duct (39) connected with both inlet ducts.

2. Device according to claim 1, wherein the inlet ducts (37,38) join each other without a partition being provided.

3. Device according to claim 1, wherein the inlet opening (32) and a first of said two outlet openings (34) are arranged diametrically opposite each other and the second outlet opening (15) is offset by less than 60° relative to the first outlet opening (34).

4. Device according to claim 1, wherein the width of the inlet ducts (37,38) and the outlet duct (39), as seen from the cross-section of the rotary element, amounts to at least 0.4-times the cross-section of the rotary element.

5. Device according to claim 1, wherein the metal detector (28) is arranged in a frame (17) or protective housing directly adjacent to the inlet opening (32).

* * * * *

UNITED STATES PATENT AND TRADEMARK OFFICE
CERTIFICATE OF CORRECTION

PATENT NO. : 6,365,858 B1
DATED : July 15, 2003
INVENTOR(S) : Vicktorius et al.

It is certified that error appears in the above-identified patent and that said Letters Patent is hereby corrected as shown below:

<u>Title page,</u>
Item [*] Notice, delete the phrase "by 0 days" and insert -- by 16 days --

Signed and Sealed this

Fourteenth Day of October, 2003

JAMES E. ROGAN
*Director of the United States Patent and Trademark Office*